United States Patent [19]

Radu et al.

[11] Patent Number: 5,932,530

[45] Date of Patent: Aug. 3, 1999

[54] N-METHYLPYRROLIDONE, DIMETHYL ESTER AND TERPENE-CONTAINING, PAINT REMOVING COMPOSITION

[75] Inventors: Georges Radu, Brossard, Canada; Shizuo Maruyama, Osaka, Japan

[73] Assignee: E.QU.I.P. International Inc., Baie D'Urfe, Canada

[21] Appl. No.: 08/722,022

[22] PCT Filed: Apr. 11, 1995

[86] PCT No.: PCT/CA95/00207

§ 371 Date: Oct. 11, 1996

§ 102(e) Date: Oct. 11, 1996

[87] PCT Pub. No.: WO95/27757

PCT Pub. Date: Oct. 19, 1995

[30] Foreign Application Priority Data

Apr. 11, 1994 [CA] Canada ................................. 2121017

[51] Int. Cl.⁶ ............................... C09D 9/00; C11D 7/50
[52] U.S. Cl. ..................... 510/212; 510/202; 510/213; 510/500
[58] Field of Search .................. 510/212, 201, 510/202, 500, 213

[56] References Cited

U.S. PATENT DOCUMENTS

| | | | |
|---|---|---|---|
| 4,780,235 | 10/1988 | Jackson | 252/170 |
| 5,011,621 | 4/1991 | Sullivan | 252/162 |
| 5,015,410 | 5/1991 | Sullivan | 252/166 |
| 5,308,527 | 5/1994 | Lallier et al. | 252/162 |
| 5,478,491 | 12/1995 | Jarema | 252/171 |
| 5,604,193 | 2/1997 | Vlasblom | 510/212 |

FOREIGN PATENT DOCUMENTS

| | | |
|---|---|---|
| 0 376 687 | 7/1990 | European Pat. Off. . |
| 0376687 | 7/1990 | European Pat. Off. . |
| 0 389 829 | 10/1990 | European Pat. Off. . |
| 0389829 | 10/1990 | European Pat. Off. . |
| 32 24 687 | 7/1983 | Germany . |

*Primary Examiner*—Christine Skane
*Attorney, Agent, or Firm*—McDermott, Will & Emery

[57] ABSTRACT

A synergistic paint removing composition is disclosed which comprises a plurality of known solvents in very specific proportions, namely: 5 to 55% of N-methyl pyrrolidone, 6 to 45% of a dibasic ester, 5 to 40% of a terpene derivative, 2 to 15% of ethylene glycol monoethyl ether acetate and 1 to 5% of a wetting agent, all of the above percentages being expressed by weight. This composition is partially miscible in water even though some of its constituents are not water miscible, thereby making the composition easy to wash and thus preventing oily film to be left on the treated substrate. The composition according to the invention is normally in liquid form. If desired, for some applications, a thickening agent can be added thereto to convert it to a gel.

13 Claims, No Drawings

N-METHYLPYRROLIDONE, DIMETHYL ESTER AND TERPENE-CONTAINING, PAINT REMOVING COMPOSITION

The present invention broadly relates to compositions usually referred "paint removers" in the trade, which are used for removing paint from a substrate, such as wood, metal like iron or steel, or plastic material like polypropylene.

More particularly, the invention relates to a paint removing composition comprising a plurality of known solvents and paint removers which are mixed in suitable amounts, and altogether "cooperate" in a synergistic manner to give very efficient results for removing paint from a substrate.

As aforesaid, numerous products are known and presently available in the market as solvents and/or paint removers. However, most of these known products are restricted to very specific uses (some are efficient with given types of paint while others are efficient with other types of paint). Most of the knows products also are either hydrophobic or hydrophillic, thereby further restricting their uses.

The object of the present invention is to provide a synergistic paint removing composition which incorporates a plurality of known solvents and/or paint removers together with one or more suitable wetting agents.

The invention is based on the discovery that if some very specific solvents and paint removers known per se are mixed in very specific amounts, the resulting composition exhibits an excellent paint removing action which is actually better than the paint removing action of each solvent or paint remover when taken separately, whatever be the type of paint to be removed or the substrate onto which this paint has been applied. The invention is also based on the discovery that when the same, very specific solvents and paint removers are mixed in said very specific amounts, the resulting composition is partially miscible in water even though some of its constituents are not water miscible, thereby making the composition easy to wash and thus preventing oily film to be left on the treated substrate.

The synergistic paint removing composition according to the invention basically comprises:

from 5 to 55% of N-methyl pyrrolidone;
from 6 to 45% of a dibasic ester selected from the group consisting of dimethyl succinate, dimethyl glutarate, dimethyl adipate and mixtures thereof;
from 5 to 40% of a water-immiscible compound selected from the group consisting of terpene derivatives and mixtures thereof;
from 2 to 15% of ethylene glycol monoethyl ether acetate; and
from 1 to 5% of at least one wetting agent consisting of 0.5 to 3% of a compound selected from the group consisting of $C_{12}$–$C_{15}$ alcohols, ethoxylated $C_{12}$–$C_{15}$-alcohols and their mixtures, and 0.5 to 2% of an ethoxylated nonylphenol derivative of the formula: $C_9H_{18}C_6H_4O(CH_2CH_2$—$O)_\alpha H$ where $\alpha$ is an interger ranging from 4 to 11.

In the above formulation as well as every where else in the following description and accompanying claims, the percentage are expressed by weight unless otherwise specified.

Advantageously, the composition may also comprise:
up to 16% of dimethylformamide; and
up to 9% of γ-butyrolactone.

Preferably, the water immiscible compound is selected from the group consisting of d-limonene, dipentene, terpinolene, terpene alcohols, turpentine oil and their mixtures. The preferred compounds are d-limonene and terpene alcohols, the most preferred one being d-limonene.

The composition according to the invention is normally in a liquid form. If desired, for some applications, a thickening agent can be added thereto to "convert" it to a gel. As a thickening agent, use can be made of up to 1.2% by weight and preferably of 0.8% of hydroxypropyl methyl cellulose.

The composition according to the invention whatever be is form can also contain up to 0.05% of a pigment to color it.

As aforesaid, the composition according to the invention is very efficient as a paint remover, whatever be the type of paint and type of substrate for it. Tests carried out by the Applicant have shown that its viscosity and gel stability (when in the form of a gel) are very good, even after two weeks at 50° C. No metal corrosion has been noticed, even after 3 months. Since the constituents of the composition do not contain fluoride, it does not cause ozone layer depletion. Its toxicity is low and its biodegrability complete. As a matter of fact, the composition according to the invention is both combustible and recyclable. As aforesaid, it is partially miscible with water and thus easily washable, with no oily film left.

COMPARATIVE TESTS

To show the efficiency of the composition according to the invention, comparative tests were carried out between a composition according to the invention, and a commercially available trichlorethane-based paint remover. These test were carried out onto different paints applied in one or more layers onto different substrates. The composition according to the invention that was used for these tests had the following formulation:

about 41.5% of N-methyl pyrrolidone like the one sold by BASF, GAF or ARCO;
about 12% of dibasic ester like the one sold by Dupont;
about 17.5% of d-limonene like the one sold by Cargill (Brazil), VanWaters & Rogers or Cedarome
about 16% of dimethylformamide (sold by VanWaters & Rogers);
about 7.2% of γ-butyrolactone like the one sold by BASF, GAF or ARCO;
about 2% of ethylene glycol monoethyl ether acetate (sold under the trade mark "Cellosolve" by VanWaters & Rogers);
about 2% of ethoxylated $C_{12}$–$C_{15}$ alcohol (laurylic alcohol/ethoxylated pentadecanol mixture sold by Rhône-Poulenc under the trade mark "Rhodasurf 25-3");
about 1% of nonyl phenol ethoxylate like the one sold by Rhône Poulenc under the trade mark "Rhodasurf NP", by Union Carbide under the trade mark "Tergitol NP-9"or VanWater & Rogers under the trade mark "Sufonic NP-95";
about 0,01% of green copper phtalocyanine pigment like those sold by BASF under the trade marks "Bayanil" and "Levanil green"; and
about 0.8% by weight of hydroxypropylmethyl cellulose like the one sold by Dow Chemicals under the trade mark "Methocel 311", whereby the composition was in the form of a gel.

In the above composition, N-methylpyrrolidone, γ-butyrolactone and dimethylformamide are known to be water-miscible industrials solvents and paint removers that are chiefly effective on water based varnish, water-based wall paint, water-based roof paint, water-based roof paint, water-based multilayer paint and water-based acrylic. However, dibasic ester, d-limonene and "Cellosolve" are paint removers not miscible with water, which are chiefly effective on acrylic, urethane, long oil alkyd and alkyd polyurethane paints.

The results that were obtained are reported in the following table.

TABLE

| PAINT | MATERIAL TO BE COATED | COMPOSITION ACCORDING TO THE INVENTION | TRICHLORO-ETHANE BASED PRODUCT |
|---|---|---|---|
| Acrylic Urethane | polypropylene | C | B |
| Long oil Alkyd | Soft iron | B | B |
| Alkyd polyurethane | Wood | B | B |
| Water based varnish | Wood | B | B |
| Water based wall paint | Wood | A | B |
| Water based roof paint | Slate | B | B |
| Water based floor paint | Slate | A | B |
| Water based multi-layer paint | Slate | B | B |
| Water based acrylic mastic paint | Slate | B | B |

Evaluation grade for single layer paints:
A: lifted in 1 minute
B: lifted in 1–5 minutes
C: lifted in 5–20 minutes
D: lifted in 20–60 minutes
E: lifted after 60 minutes
Evaluation grade for multi-layer paints:
A: 100% removed
B: 80% removed
C: 50% removed
D: 30% removed
E: not removed

We claim:

1. A synergistic paint removing composition consisting essentially of:
   from 5 to 55% of N-methyl pyrrolidone;
   from 6 to 45% of a dibasic ester selected from the group consisting of dimethyl succinate, dimethyl glutarate, dimethyl adipate and mixtures thereof;
   from 5 to 40% of a water-immiscible compound selected from the group consisting of terpene derivatives, and mixtures thereof;
   from 2 to 15% of ethylene glycol monoethyl ether acetate;
   from 0.5 to 3% of a wetting agent selected from the group consisting of $C_{12}$–$C_{15}$ alcohols, ethoxylated $C_{12}$–$C_{15}$-alcohols and their mixtures, and 0.5 to 2% of an ethoxylated nonylphenol derivative of the formula;
   $C_9H_{18}C_6H_4O(CH_2CH_2-O)_\alpha H$
   where $\alpha$ is an integer ranging from 4 to 11;
   all the above mentioned percentages being expressed by weight.

2. The composition of claim 1, wherein the water immiscible compound is selected from the group consisting of d-limonene, dipentene, terpinolene, terpene alcohols, turpentine oil and their mixtures.

3. The composition of claim 2, wherein the water immiscible compound is d-limonene.

4. The composition of any one of claims 1, 2 and 3, further consisting essentially of up to 16% of dimethylformamide.

5. The composition of any one of claims 1, 2 and 3 further consisting essentially of up to 9% of γ-butyrolactone.

6. The composition of any one of claims 1, 2 and 4, further consisting essentially of
   up to 16% of dimethylformamide; and
   up to 9% of γ-butyrolactone.

7. The composition of claim 2, further consisting essentially of up to 0.05% of a pigment.

8. The composition of claim 7, wherein the pigment is copper phtalocyanine.

9. The composition of any one of claims 1, 2, 3, 7, or 8, further consisting essentially of
   up to 1.2% of thickening agent,
   whereby said compositions is in the form of a gel.

10. The composition of claim 9, wherein said thickening agent is hydroxypropylmethyl cellulose.

11. A synergistic paint removing composition consisting essentially of:
    from 5 to 55% of N-methyl pyrrolidone;
    from 6 to 45% of a dibasic ester selected from the group consisting of dimethyl succinate, dimethyl glutarate, dimethyl adipate and mixtures thereof;
    from 5 to 40% of a water immiscible compound selected from the group consisting of d-limonene and terpene alcohols;
    2 to 15% of ethylene glycol monoethyl ether acetate;
    up to 16% of dimethylformamide;
    up to 9% of γ-butyrolactone;
    from 0.5 to 3% of an ethoxylated $C_{12}$–$C_{15}$ alcohol;
    from 0.5 to 2% of an ethoxylated nonyl phenol derivative; and
    up to 0.05% of a pigment,
    all the above mentioned percentages being expressed by weight.

12. The composition of claim 11, further consisting essentially of:
    up to 1.2% by weight of hydroxypropylmethyl cellulose, whereby said composition is in the form of a gel.

13. The composition of claim 11 or 12, consisting essentially of:
    about 41.5% of said N-methyl pyrrolidone;
    about 12% of said dibasic ester;
    about 17.5% of d-limonene as said water-immiscible compound;
    about 16% of dimethylformamide;
    about 7.2% of said γ-butyrolactone;
    about 2% of said ethylene glycol monoethyl ether acetate;
    about 2% of said ethoxylated $C_{12}$–$C_{15}$ alcohol;
    about 1% of said ethoxylated nonyl phenol derivative; and
    about 0,01% of green copper phtalocyanine as said pigment.

* * * * *

UNITED STATES PATENT AND TRADEMARK OFFICE
CERTIFICATE OF CORRECTION

PATENT NO. : 5,932,530
DATED : August 3, 1999
INVENTOR(S) : Radu, Georges, Maruyama, Shizuo It is certified that error appears in the above-identified patent and that said Letters Patent is hereby corrected as shown below:

On the title page: Item [73] should read -- "E.QU.I.P. International Inc. Baie d'Urfe, Canada, and Asahipen Corporation, Osaka, Japan --.

Signed and Sealed this

Twenty-first Day of December, 1999

Attest:

Attesting Officer

Q. TODD DICKINSON

Acting Commissioner of Patents and Trademarks